US009817524B1

(12) United States Patent
Christy

(10) Patent No.: US 9,817,524 B1
(45) Date of Patent: Nov. 14, 2017

(54) TOUCH ACCURACY OF AN ELECTRONIC DEVICE

(71) Applicant: Amazon Technologies, Inc., Reno, NV (US)

(72) Inventor: James Edwin Christy, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 380 days.

(21) Appl. No.: 13/712,817

(22) Filed: Dec. 12, 2012

(51) Int. Cl.
G06F 3/041 (2006.01)
G06F 3/044 (2006.01)

(52) U.S. Cl.
CPC .................................. G06F 3/044 (2013.01)

(58) Field of Classification Search
CPC ..... G09G 3/344; G09G 2380/14; G06F 3/044
See application file for complete search history.

(56) References Cited

U.S. PATENT DOCUMENTS

| 8,040,142 | B1* | 10/2011 | Bokma et al. | 324/658 |
| 2012/0113031 | A1* | 5/2012 | Lee | G02F 1/167 345/173 |
| 2012/0319959 | A1* | 12/2012 | Saponas | G06F 3/0237 345/173 |
| 2013/0234978 | A1* | 9/2013 | Ksondzyk | 345/174 |
| 2013/0249816 | A1* | 9/2013 | Zheng et al. | 345/173 |
| 2013/0257756 | A1* | 10/2013 | Chang | G06F 3/0418 345/173 |
| 2013/0265243 | A1* | 10/2013 | Law | G06F 1/3262 345/173 |
| 2014/0160085 | A1* | 6/2014 | Rabii et al. | 345/178 |

\* cited by examiner

*Primary Examiner* — Lixi C Simpson
(74) *Attorney, Agent, or Firm* — Lee & Hayes, PLLC

(57) ABSTRACT

An electronic device improves touch accuracy and prevents false or missed touches on a capacitive touch display by monitoring contextual events or environments unrelated to user input. When a capacitance change occurs, the device dynamically evaluates whether it may have been caused by the contextual events or environments. The device intelligently adjusts one or more parameters to account for the change in capacitance caused by the contextual events or environments to thereby prevent detection of the capacitance event as a false touch and/or prevent a missed true and legitimate user input.

27 Claims, 6 Drawing Sheets

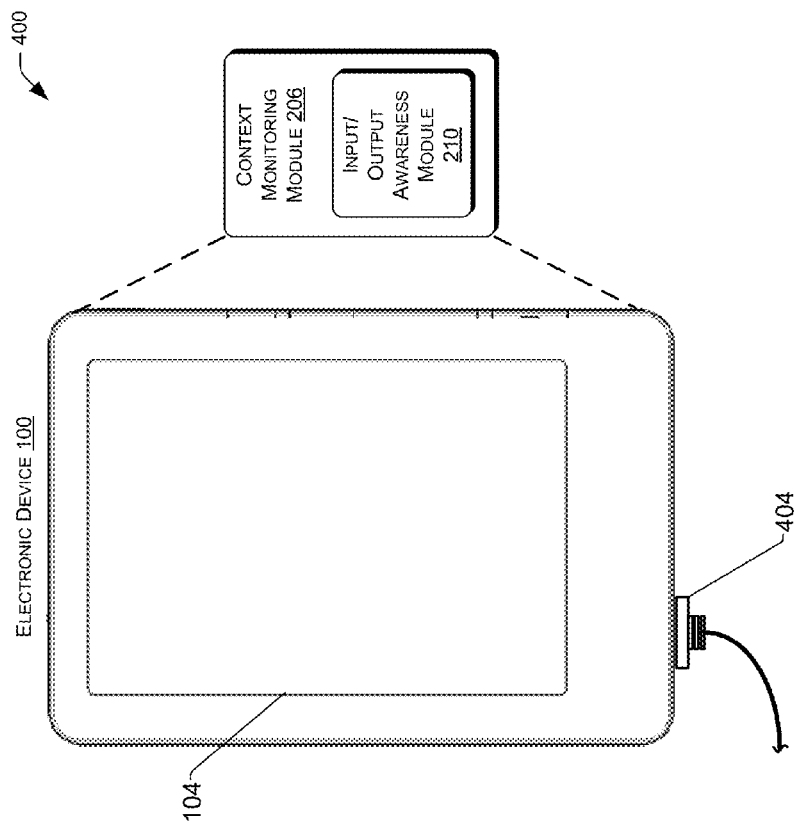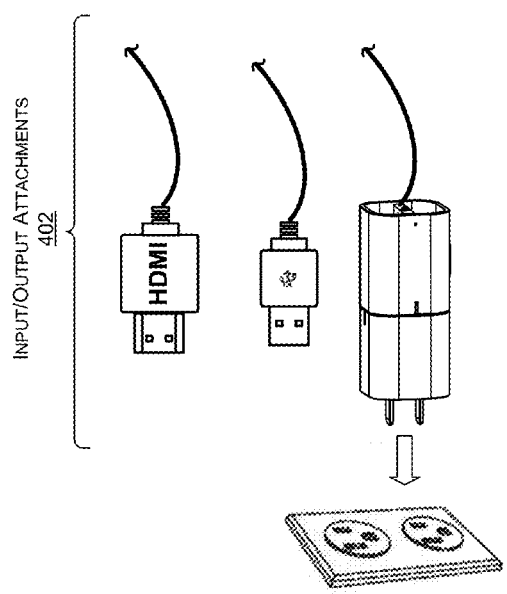
FIG. 4

TOUCH ACCURACY OF AN ELECTRONIC DEVICE

BACKGROUND

A large and growing population of users employs various electronic devices to consume digital content, such as music, movies, images, electronic books, and so on. Among these electronic devices are electronic book (eBook) reader devices, cellular telephones, desktop computers, portable media players, tablet computers, netbooks, and the like. Often these electronic devices incorporate capacitive touch screen technology.

One problem with using such devices is that in some situations interferences caused by factors external to the device may adversely impact the capacitive sensor technology, thereby creating false touches or even missing a user's touch. The cause of these false or missed touches are often not intuitively obvious to the user, causing frustration and confusion during otherwise normal use of the device, leaving a less than desired impression of the device in the user's mind. As such, finding ways to increase the functionality of such devices and thus enhancing a user's experience continues to be a high priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates another example electronic device with various input/output connectivity, such as high-definition multimedia interface (HDMI) input/output, universal serial bus (USB) input/output, devices chargers, and the like that may adversely impact capacitive touch technology.

FIG. 5 illustrates another example electronic device equipped with a proximity sensor to evaluate the contextual surroundings of the device, such as the proximity of other electronic devices or the location of the device on a table, and so on.

DETAILED DESCRIPTION

Overview

This disclosure describes techniques for improving capacitive touch accuracy of an electronic device. The techniques allow for a more accurate and precise determination of whether a touch event on the electronic device is a true touch versus a touch event caused by one or more events or environments of the device unrelated to the capacitive touch technology.

In some implementations, the techniques described are particularly useful for electronic devices that employ a bi-stable display, such as electronic book (eBook) reader devices. Bi-stable displays, such as electronic paper displays, are capable of holding text or other rendered images even when very little or no power is supplied to the display of the device. A bi-stable display uses a voltage waveform to update the content on the display of the device. The voltage waveform update may cause a fluctuation in capacitance received at the touch screen layer of a display, which may be adversely detected by the capacitive touch sensor as a user intended touch. In other words, the bi-stable display update may cause a false touch. In some instances, a true user's touch may be undetected by the capacitive touch sensor when the user's attempted touch occurs at substantially the same time as the update of the bi-stable display.

The techniques described herein anticipate potential causes of these false and missed touches (e.g., such as those caused by the bi-stable display updates) and provide ways to avoid registering the causes as a touch. For instance, upon detecting an update of the bi-stable display, the techniques may adjust certain parameters for operating the device with capacitive touch technology to prevent false and missed touches.

In some instances, the techniques may monitor one or more contextual events or environments of the electronic device. Such contextual events or environments may include device touch location expectation, device input/output awareness, and device proximity awareness. In instances where the device receives an indication of capacitance fluctuation on the touch screen, the device dynamically and intelligently evaluates the indication of capacitance fluctuation based on any monitored contextual events or environments of the device to determine whether to adjust the parameters of the touch screen.

Furthermore, if the indication of capacitance fluctuation is due to the one or more contextual events or environments, the techniques may adjust the parameters by modifying digital filters to filter out or disregard the capacitive fluctuation. In other implementations, the techniques may modify touch sensors to limit or otherwise focus the sensors' ability to receive a touch input.

The techniques for improving capacitive touch sensor accuracy in an electronic device may be implemented in many ways. Example implementations are provided below with reference to the figures.

Example Electronic Device

Figure 1:
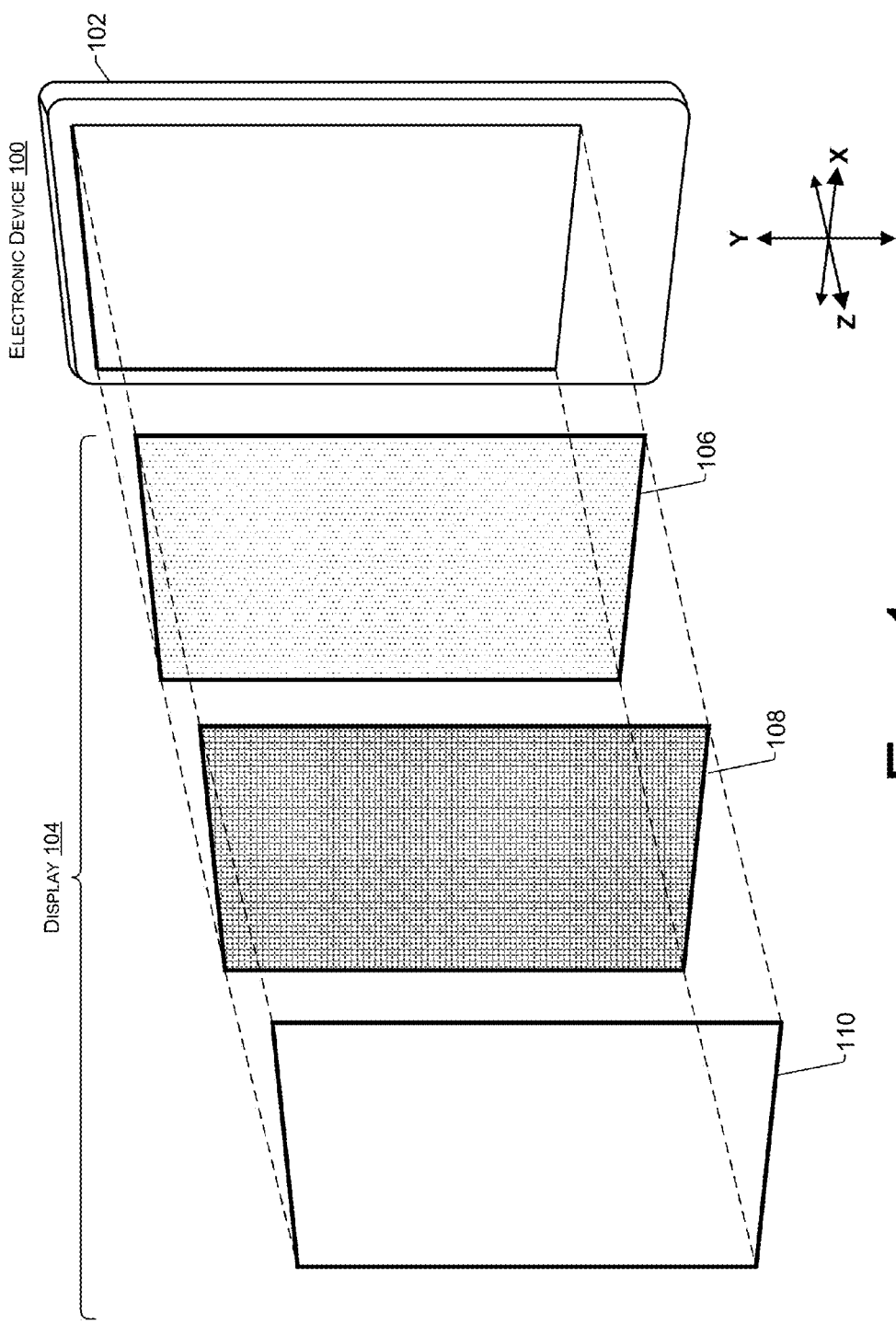
FIG. 1 illustrates an example electronic device where the example device may comprise a backing and a screen which may comprise a bi-stable layer, a capacitive touch layer, and a protective outer layer.

FIG. 1 illustrates an example electronic device 100 that is configured to improve touch accuracy according to various implementations. The electronic device 100 may be implemented as any number of electronic devices, such as an eBook reader device, a tablet computing device, a smart phone, a portable gaming device, a portable digital assistant, a laptop or netbook computer, and so forth. Furthermore, the electronic device 100 may not necessarily be a mobile or portable device. Thus, in some implementations, the electronic device 100 may include a display of a desktop computer, a workstation, or a server computing device, a cash register, a gaming system, a television, an appliance, industrial equipment, home electronics, or essentially any electronic device that employs a capacitive touch screen.

The electronic device 100 includes a body 102 to house multiple electronic components and a display 104 mounted to the body 102. As illustrated, the display 104 is shown in an exploded view to expose multiple layers. The display may allow presentation of any number of content items (e.g., text, pictures, video, etc.) as well as graphical user interfaces or other interactive images to a user. In the illustrated example, the display covers a substantial portion of a front surface of device 100; however, this need not necessarily be the case in other examples.

The display 104 may comprise of multiple layers, such as the three layers 106, 108, and 110 shown in FIG. 1. A first layer 106 may represent a content display layer for rendering content on the device 100. In one particular implementation, the content display layer 106 is an electronic paper display, which represents an array of possible display technologies that largely mimic the look of ordinary ink on paper, such as eInk displays. Electronic paper displays are often bi-stable, meaning that these displays are capable of holding text or other rendered images even when little or no power is supplied to the display. A bi-stable display layer 106 may utilize oppositely charged light and dark particles to render images on display 104 of device 100. For instance, a controller may send a voltage waveform or signal to move the particles between different positions within layer 106 to achieve different color shades. For example, in order to render a white image on the display, a controller moves the light particles to the side of layer 106 closest to a user by creating a corresponding charge at an electrode near the outer surface of layer 106 and moves the dark particles to the inner surface of layer 106 by creating a corresponding charge at an electrode near the inner surface of layer 106.

A second layer 108 may represent a touch screen layer having one or more associated touch sensors (not shown in FIG. 1). The touch screen layer 108 may utilize capacitive sensing technology configured to sense a presence of an input object, such as a finger, another body part, a stylus, a pointer, or the like, within a predefined proximity of the display 104. For example, as illustrated, touch screen layer 108 may utilize projected capacitive touch (PCT) technology where the layer may be constructed of two separate perpendicular sheets of columns and rows of conductive material to form a grid of electrodes. A fluctuation or change in capacitance may be detected when an object or event closes the gap between the two separate perpendicular sheets of the columns and rows. However, in other implementations, other capacitance touch technology may be used in touch screen layer 108. In some implementations, the capacitive touch technology may not be limited to a touch screen of a device. For example, the capacitive touch technology may be located on the bezel, sides, back, or any other external location of a device.

A third layer 110 represents a protective screen layer to protect the underlying touch screen layer 108 and content display layer 106. The protective layer 110 is transparent to permit viewing of the content on the content display layer. The protective layer 110 may be made of a plastic material that is scratch resistant or otherwise rugged to help prevent or attenuate damage to the display 104 that might be caused by incorrect usage or accidental drops of the device 100.

Figure 2:
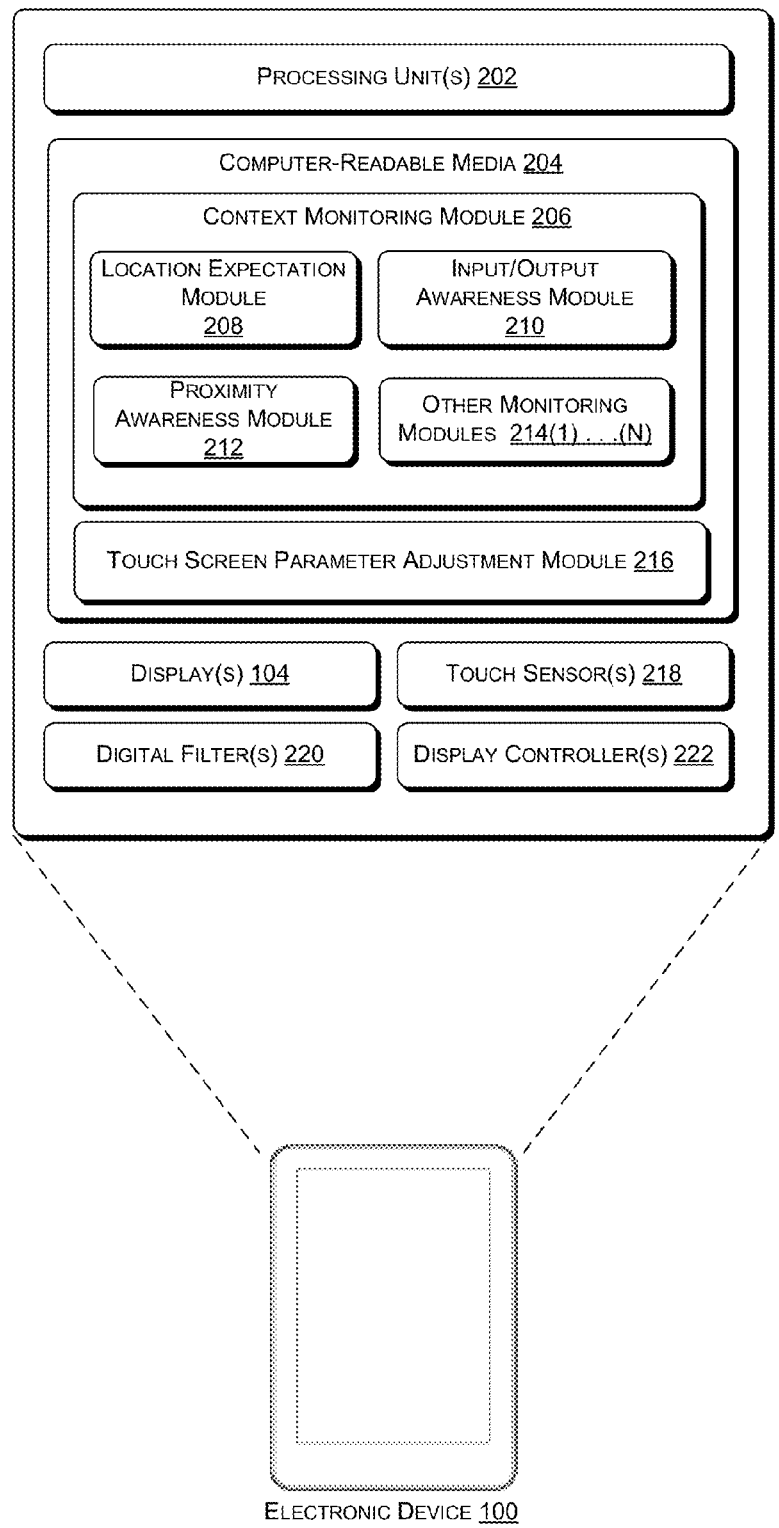
FIG. 2 illustrates selected components of an example electronic device, including a context monitoring module and touch screen parameter adjustment module.

FIG. 2 illustrates example components that may be implemented in device 100 of FIG. 1 to implement the functionality described herein according to some implementations. The device 100 includes one or more processing units 202 and computer-readable media 204. Depending on the configuration of device 100, the computer-readable media 204 (and other computer-readable media described throughout this document) is an example of computer storage media and may include volatile and nonvolatile memory. Thus, the computer-readable media 204 may include, but is not limited to, RAM, ROM, EEPROM, flash memory, or other memory technology, or any other medium which can be used to store media items or applications and data which can be accessed by device 100. The computer-readable media 204 may be used to store any number of functional components that are executable on the processing unit(s) 202. In some implementations, these functional components comprise instructions or programs that are executable by the processing unit(s) 202 and that, when executed, implement operational logic for performing associated actions of the device 100.

A context monitoring module 206 is one possible functional component shown stored in the computer-readable media 204 for execution on the processing unit(s) 202. The context monitoring module 206 is configured to monitor various situational contexts and environments within which the electronic device 100 is operating. The context monitoring module 206 may include a location expectation module 208, an input/output awareness module 210, a proximity awareness module 212, and other context monitoring module(s) 214(1)-(N).

Further, a touch screen parameter adjustment module 216 may also be provided in computer-readable media 204 and may be executed on the processing unit(s) 202 to adjust parameters associated with operation of the touch screen 108 in response to detection of contextual or environmental events that may cause false or missed touches. The touch screen parameter adjustment module 216 provides a solution interface between the monitoring modules monitoring module 206 and one or more device components that may be adjusted to help mitigate missed or unwanted false touches caused by the events being monitored. When an event is detected by one of the context monitoring modules, the parameter adjustment module 216 transmits appropriate control signals to various electronic components to cause the components to operate in a modified state for a least a period of time in which the detected event may disrupt proper operation of the capacitive touch screen 108. The control signals may be communicated over any number of communication channels (not shown), such as an i2C bus, a serial peripheral interface (SPI) bus, a peripheral component interconnect (PCI) bus, a peripheral component interconnect express (PCIe) bus or any purpose built messaging channel.

In this way, the context monitoring module 206 is configured to monitor one or more contextual environments of the electronic device and dynamically assess whether a capacitive event may be caused based on the environments of the device. The context monitoring module 206 may then communicate with the touch screen parameter adjustment module 216 to adjust the configuration of the capacitive touch screen 108 by modifying one or more device components to account for the one or more contextual environments.

In FIG. 2, the context monitoring module 206 includes representative modules 208, 210, 212, and 214(1)-(N) showing example techniques to improve touch accuracy on the touch screen layer 108 by attempting to identify potential causes of false or missed touches. For instance, the location expectation module 208 monitors areas on display 104 where a touch input is expected. The location expectation module 208 may communicate with the display controllers to inform the touch sensors when and/or where an update is likely to occur on the display 104 based on one or more areas or regions where a touch input is expected. If the location of an expected touch input is known or anticipated, the location expectation module 208 may communicate with the touch screen parameter adjustment module 216 to adjust operating parameters. For instance, the parameter adjustment module 208 may change settings of one or more digital filters to heighten sensitivity at corresponding region(s) of the display 104 that may be expecting an input while lessening or blocking input that might be sensed in region(s) not expecting an input. As a result, there is a reduced likelihood of a missed touch event at the regions of heightened sensitivity of the display 104. In some situations, the parameter adjustment module 208 may further direct the capacitance touch screen 108 to avoid any detection for a period of time when the bi-stable screen 106 is updating. As a result, there is a reduced likelihood of a false touch event interfering with the updated region(s) of display 104. A more detailed discussion of the location expectation module 208 is described below in more detail with reference to FIG. 3.

In some implementations, the context monitoring module 206 includes or has access to an input/output awareness module 210 to monitor whether device 100 has been connected to one or more input/output attachments. Input/output attachments may cause capacitance fluctuations detected at the touch screen layer 108 of display 104. Example input/output attachments may include manufacturer supplied charger cables, after-market charger cables, USB cables, HDMI cables, headphones, and the like. Additionally or alternatively, example input/output attachments may also include a device attached at the far end of a USB cable, HDMI cable, etc. In some implementations, a communication protocol may allow the input/output awareness module 210 to determine the identity of an input/output attachment as a specific device. For example, the communication protocol may identify the type of device that is connected at the far end of a USB cable. In some instances, a specific device may be associated with a known or predetermined capacitance fluctuation. As a result, the input/output awareness module 210 may anticipate the known capacitance fluctuation of the specific device. The input/output awareness module 210 may communicate with touch screen parameter adjustment module 216 to adjust one or more parameters when any identified input/output attachment that may adversely alter the capacitance of device 100 is detected. A more detailed discussion of I/O awareness module 210 is described below in more detail with reference to FIG. 4.

In other implementations, the context monitoring module 206 includes or has access to a proximity awareness module 212 to monitor whether device 100 is within a detectable proximity to another electronic device or other object that may adversely affect capacitance of the touch screen layer 108 of display 104. Other devices or objects may include electronic devices (e.g., eBook reader devices, tablet computing devices, smart phones, portable gaming devices, portable digital assistants, laptop computers), appliances (e.g., refrigerator, electronic stoves, etc.), furniture (e.g., table, counter-top), devices prone to generating static electricity, and/or any other object that may interfere with the capacitance of device 100. In some implementations, the proximity awareness module 212 may detect whether the device is in contact with a semi-solid surface (e.g., in the hands of a user, in the lap of a user, etc.). A more detailed discussion of the proximity awareness module 212 is described below in more detail with reference to FIG. 5.

As illustrated, the context monitoring module 206 may include or have access to other monitoring modules 214(1)-(N) to monitor other device events or environments that may alter or interfere with the capacitance of the touch screen layer 108 of device 100. When such capacitance-affecting events can be identified, a module 214 can be configured to detect the condition or situation that gives rise to the capacitance-affecting events and design a solution to mitigate or prevent any false or missed touch detections. For example, one possible monitoring module 214 may simply detect when the bi-stable ePaper display 106 is to be updated to alter content being displayed. In response to this detection, the parameter adjustment module 216 may direct the touch screen 108 to forego reading any capacitance changes as touches for the brief instance that the update occurs. When the display update is completed, the touch screen 108 may return to sensing capacitance changes as indications of user input.

FIG. 2 further illustrates that device 100 may include display 104, as described above with reference to FIG. 1. Additionally, some example ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs.

Additionally, device 100 may include touch sensor(s) 218, which enables a user of device 100 to operate and interact with device 100 via touch gestures. In one implementation, the touch sensor(s) 218 may be placed behind, on top of, or integral with the touch screen layer 108 of the display 104, such that user input through contact or other gestures relative to the display 104 may be sensed by the touch sensor(s) 218. In another implementation, the touch sensor(s) 218 may be placed in another part of device 100. For example, the touch sensor(s) 218 may be placed on a device bezel, sides of the body 102, and/or the back of the body 102. In some instances, the touch sensor(s) 218 and the display 104 are integral to provide a touch-sensitive display that displays a user interface, applications, or content items and allows users to navigate via touch inputs. In some instances, the touch sensor(s) 218 are capable of detecting touches as well as determining an amount of pressure or force of these touch inputs.

Device 100 may further be equipped with one or more digital filter(s) 220. Digital filter(s) 220 may act to restrict, limit or filter inputs that may be determined by one or more modules within or accessible to the context monitoring module 206 to be a false touch input or "noise" based on one or more contextual events or environments. For instance, digital filter(s) 220 may be dynamically modified to limit performance or implementation of a capacitive event that has been determined to be caused by events other than a user's touch input. In certain implementations, one or more parameters associated with the functionality of digital filter(s) 220 may be provided by the manufacturer at the time of device production. Additionally or alternatively, the digital filter(s) 220 may allow heighten sensitivity at area(s) of the display 104 that may be expecting a touch input to reduce the likelihood of a missed touch input.

FIG. 2 further illustrates that device 100 may include display controller(s) 222 which may change the polarities and move dark and/or white particles within a pixel between various positions within the bi-stable layer 106 to cause an update on the display 104. Display controller(s) may allow for per-pixel updating of the bi-stable layer 106 of device 100. That is, the controller(s) 222 may update any arbitrary block or region of one or more pixels of the display 104 at any one time.

Device 100 may have additional features or functionality. For example, device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Examples Contextual Events/Environments

Figure 3:
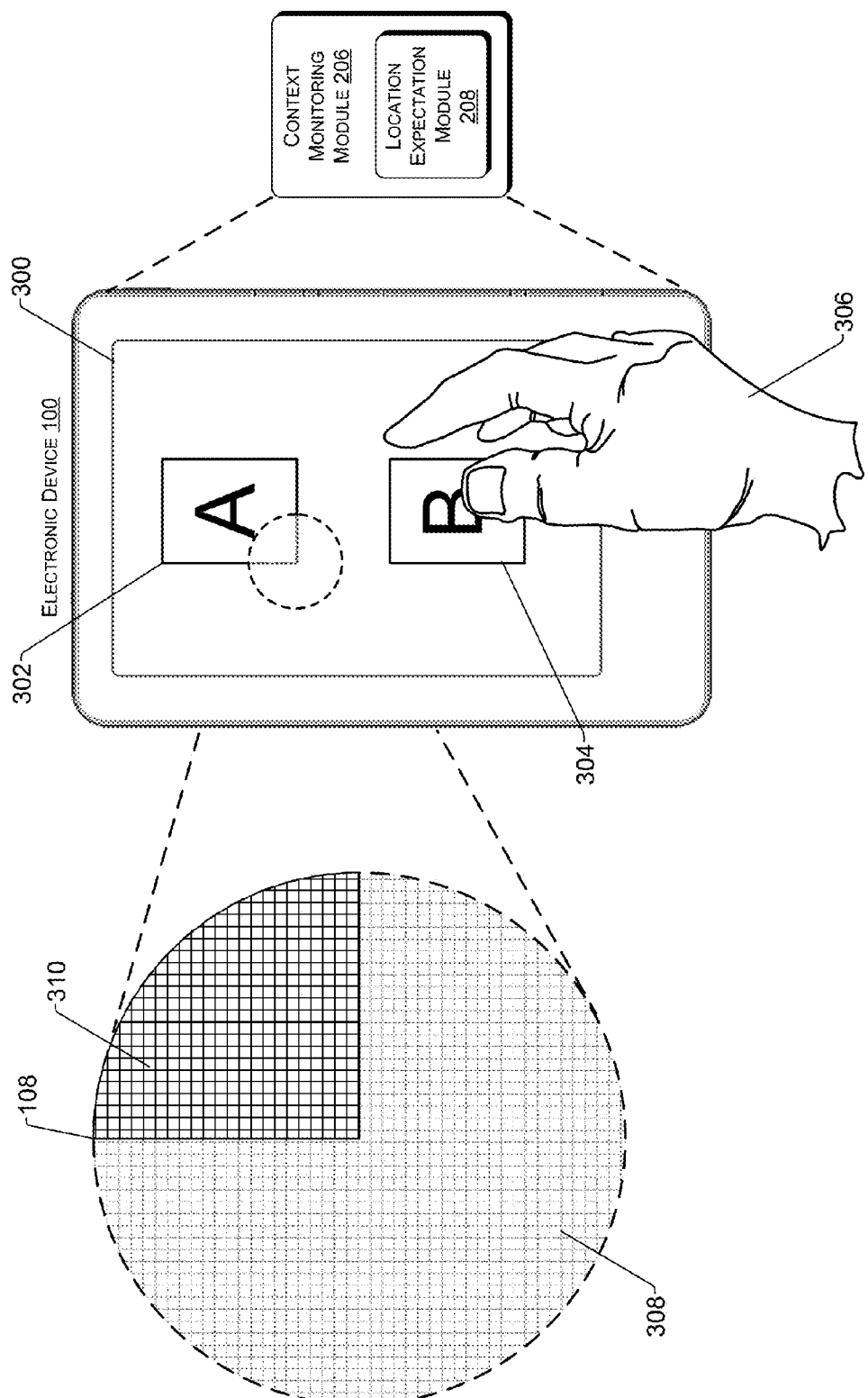
FIG. 3 illustrates an example electronic device where the capacitive touch screen layer of the device has been modified as a result of a touch location expectation. As illustrated, the capacitive touch layer of the electronic device is modified to accept a touch input within the area of expectation.
Figure 5:
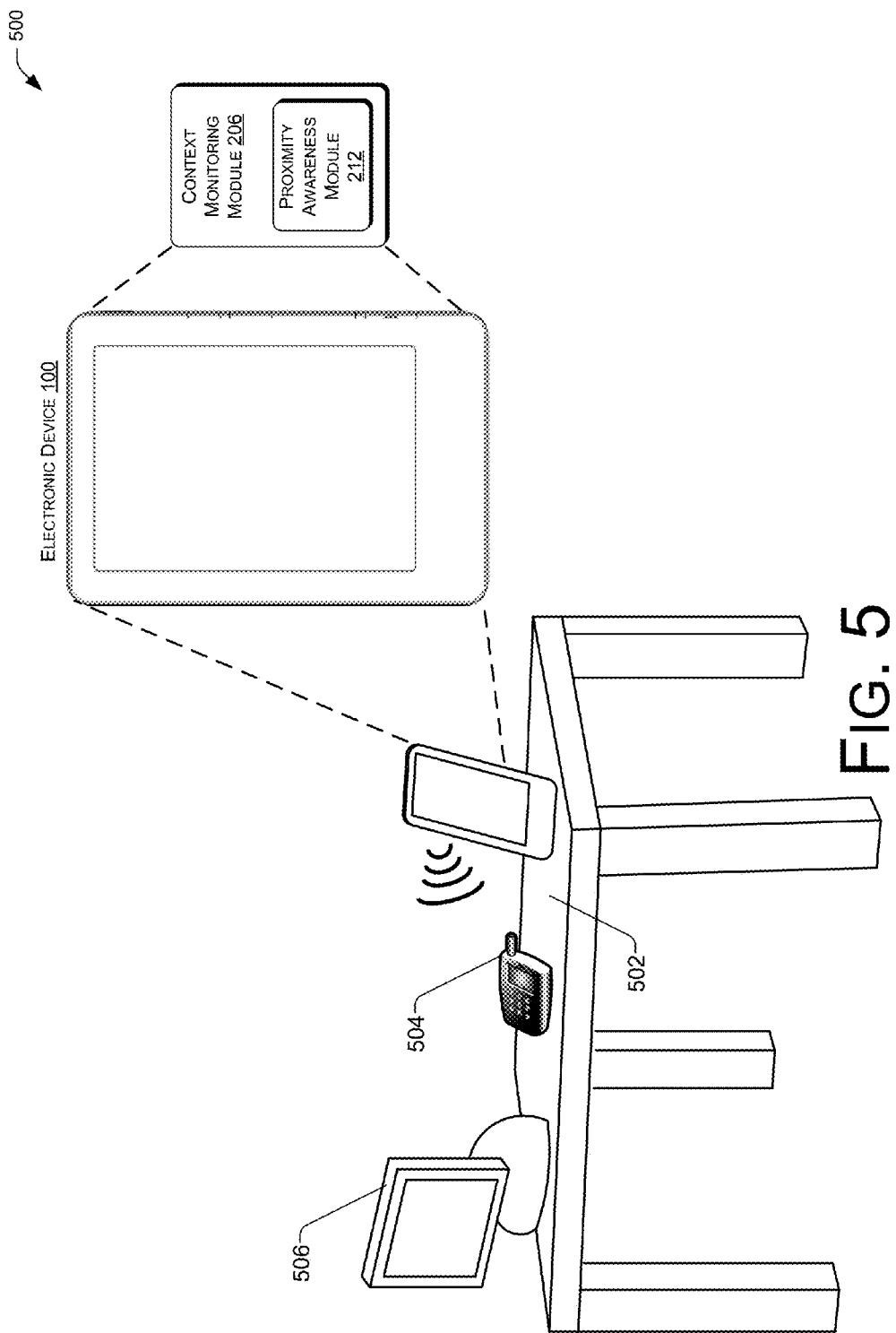

FIGS. 3-5 illustrate various example events or environments that the context monitoring module 206 of device 100 may monitor in an effort to dynamically evaluate and adjust one or more parameters of the capacitive touch layer 108 of display 104 to prevent false or missed touches.

FIG. 3 generally illustrates device 100 displaying a graphical user interface (UI) 300 on the display 104. In certain implementations and as described above, the location expectation module 208 may monitor areas or regions on display 104 where a touch input is expected. As illustrated in FIG. 3, the location expectation module 208 may recognize that selection areas 302 and 304—designated with capital letters A and B, respectively, displayed on the UI 300—are areas where a touch input may be expected. Selection areas 302 and 304 may correspond to a button, key or other control presented on the UI 300 for selection by the user 306.

In some implementations, where the location expectation module 208 has identified one or more areas on UI 300 where a touch input is anticipated, the touch screen parameter adjustment module 216 may adjust one or more parameters of the touch screen. For example, the touch screen parameter adjustment module 216 may communicate with one or more digital filter(s) 220 to filter one or more touch input(s) in one or more area(s) that are not expecting a touch input based on the monitoring by the location expectation module 208. As illustrated in FIG. 3, the touch screen parameter adjustment module 216 may adjust one or more digital filter(s) 220 to filter all touch events that occur within the region 308 of the expanded UI 300, while allowing touch events expected to occur with region 310 of the illustrated UI 300.

In other implementations, where the location expectation module 208 has identified one or more areas on UI 300 where a touch input is anticipated, the touch screen parameter adjustment module 216 may communicate with touch sensor(s) 218 to alter the capacitance of the touch screen layer 108 of the display 104. As illustrated by area 308 in FIG. 3, the touch screen parameter adjustment module 216 may adjust one or more parameters of the touch screen layer 108 by temporarily disregarding, sedating, and/or eliminating the functionality of one or more touch sensor(s) in one or more areas where a touch input is not expected on the UI 300. While simultaneously allowing normal functionality, or even heightened sensitivity, of the touch sensor(s) in area 310 that may be expecting a touch input.

FIG. 4 illustrates another example event or environment 400 where the context monitoring module 206 of device 100 may monitor in order for device 100 to dynamically evaluate and adjust one or more parameters of the capacitive touch layer 108 of display 104. As illustrated, one or more input/output attachments may be connected to device 100 at location 404. Each input/output attachment may have the ability to alter the capacitance of the touch screen layer 108 of the display 104. In some implementations, example input/output attachments may include various device chargers such as a charger provided by device manufacturer at the time of purchase or an after-market charger manufactured to be compatible with device 100. Additional input/output attachments may include USB cables, HDMI cables, headphones, microphones, speakers, and the like. Furthermore, such input/output attachments may be attached to device 100 at any compatible location or port on device 100.

The input/output awareness module 210 may monitor the attachment of one or more input/output cables to device 100. In some implementations, the input/output awareness module 210 may specifically identify the type of input/output attachment 402 has been attached to device 100 in order to identify the potential change in the capacitance of the touch screen layer 108 of the display 104. Once the input/output awareness module 210 identifies one or more connected input/output attachments 402, the module 210 may communicate with touch screen parameter adjustment module 216 to adjust one or more parameters of the touch screen layer 108 to account for the altered capacitance caused by the connection of each input/output attachment 402.

In certain implementations, where module 210 has identified an input/output attachment has been connected to device 100, the touch screen parameter adjustment module 216 may adjust one or more parameters associated with digital filter(s) 220. In some implementations, the one or more parameters associated with digital filter(s) 220 may be optimized or adjusted to account for the change of capacitance resulting from the connection of the one or more input/output attachments 402.

FIG. 5 illustrates another example event or environment 500 where the context monitoring module 206 of device 100 may utilize a proximity awareness module 212 to monitor the capacitive touch layer 108 of display 104. In certain implementations, the proximity awareness module 212 may monitor the surrounding environment of device 100 to determine if device 100 has been placed in proximity to another object. For example, the proximity awareness module 212 may identify that device 100 has been placed on table 502. In some implementations, the capacitance of the touch layer 108 of display 104 may be altered by placing device 100 upon a table. In other implementations, the proximity awareness module 212 may identify that device 100 is being operated in proximity to one or more other electronic devices. FIG. 5 illustrates such other electronic devices as a smart phone 504 and/or desktop computer 506. However, in other implementations, the other electronic devices may include any other device or object that may cause a detectable change to the capacitance of the touch layer 108 of device 100.

In other implementations, proximity awareness module 212 may monitor the surrounding environment of device to detect any other factor that may alter the capacitance of the touch layer 108. For example, metallic materials, weather, heat sources, radiation sources, radio frequency environments, whether the device is located in the hands or lap of a user and the like.

In an event that the proximity awareness module 212 detects that other objects or devices are in the vicinity of device 100, module 212 may communicate with touch screen parameter adjustment module 216. As described above, touch screen parameter adjustment module 216 may adjust one or more parameters associated with device 100, such as, by altering one or more digital filter(s) 220. In certain implementations, the touch screen parameter adjustment module 216 may provide a real-time adjustment to one or more digital filter(s) to account for the monitored change in capacitance caused by the other object or devices that are near to device 100.

In some implementations, the proximity awareness module 212 may also monitor the surrounding environment of device 100 to determine the specific object or other device that is in proximity of device 100 in order to determine the specific change in capacitance of device 100 caused by the object or other device. Depending on the specific devices identified, the parameter adjustment module 216 may have associated profiles of the devices and make adjustments tailored to avoid capacitance fluctuations that might be caused by such devices.

Example Processes

Figure 6:
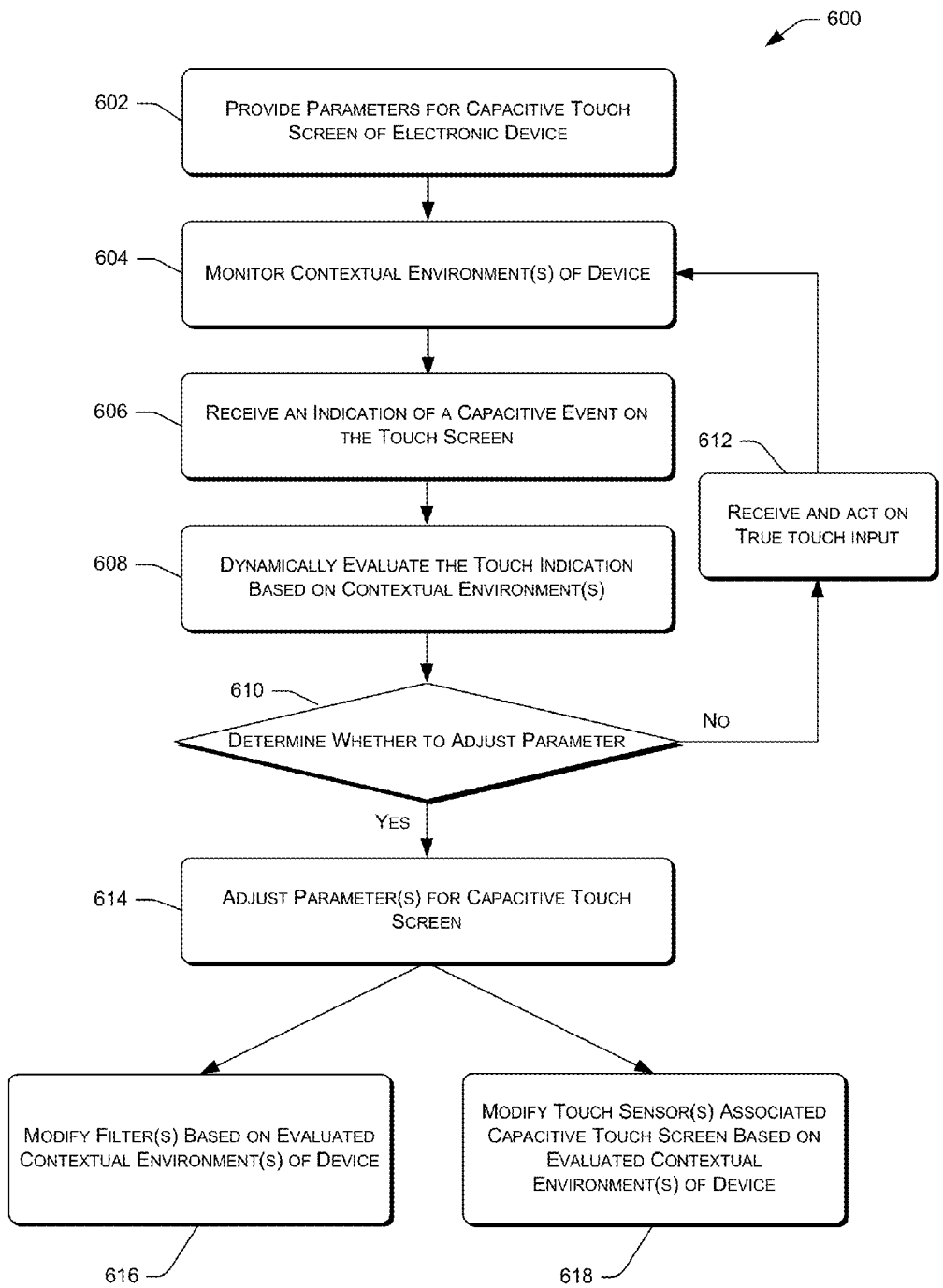
FIG. 6 illustrates an example flow diagram of a process for dynamically detecting one or more contextual events or environments in order to adjust one or more parameters on the electronic device, particularly parameters associated with operation of the capacitive touch technology.

FIG. 6 illustrates an example process 600 for implementing the techniques described above of dynamically detecting one or more contextual events or environments in order to adjust one or more parameter to prevent false or missed touches on an electronic device. The process 600 is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. Finally, the order in which the operations are described is not intended to be construed as a limitation, and any number of the described operations can be combined in any order and/or in parallel to implement the process.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The process 600, at 602, provides one or more parameters for a capacitive touch screen of an electronic device. For example, the process may provide default parameters for operation of one or more digital filter(s) of the electronic device.

At 604, the process 600 monitors one or more contextual events or environments of the device. For example, the process may monitor one or more of the following situations: when the displayed content might invoke a user touch response and where that touch location might be expected on the touch screen; when a content display, such as an ePaper display, might go through a screen update; when input/output attachments are connected to the device; and/or when the device is proximal to other objects and device(s).

At 606, the process receives an indication of a capacitive event on the touch screen of the device. This indication may be a legitimate or true touch from a user, or it may be an unwanted false touch caused by an extraneous event.

At 608, the process 600 dynamically evaluates the touch indication based on the one or more monitored contextual environments of the device. For instance, the various contexts being monitored may suggest that the capacitive event on the touch screen is caused by something other than the user's finger or stylus. The process may examine any number of operating environments, such as those described above with reference to FIGS. 2-5.

At 610, it is determined whether to adjust the one or more parameters for the capacitive touch screen of the device in response to the evaluation. For example, if the process 600 evaluates that the touch indication is not caused by the one or more monitored contextual events or environments (i.e., the "no" branch from 610), the capacitive event is deemed to be a true or legitimate touch input from the user and the touch input is received and acted upon at 612. The process 600 then continues to monitor the one or more contextual events or environments at 604.

However, if the process 600 evaluates that the touch indication is caused by some other contextual event not related to a true user input (i.e., the "yes" branch from 610), the process 600 continues with adjustment of one or more parameters for the capacitive touch screen at 614.

At 616, the process 600 may adjust the one or more parameters for the capacitive touch screen by modifying one or more filters, such as digital filters 220 described above, based on the one or more evaluated contextual environments of the device. As described with reference to FIG. 5, above, the process 600 may modify one or more digital filters to restrict an indication of a capacitive touch event when it has been determined that the indication is a result of the device operating within proximity of another object or device. Additionally or alternatively, at 618, the process 600 may adjust the one or more parameters for the capacitive touch screen by modifying one or more touch sensors associated with the capacitive touch screen based on the one or more evaluated contextual environments of the device. For example, as described with reference to FIG. 3 above, the process 600 may modify one or more touch sensors embedded in the capacitive touch layer 108 of display 104 to limit an area within the capacitive touch layer 108 capable of receiving a touch indication when the process is expecting a touch indication within a certain other area of the capacitive touch layer 108.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
under control of one or more computing systems configured with executable instructions,
determining a first responsiveness parameter of one or more touch sensors associated with a touch screen of an electronic device;
monitoring one or more contextual environments within which the electronic device operates based at least in part on information from one or more sensors associated with the electronic device;
determining, based at least in part on the information, that the electronic device is within a threshold distance from an object;
determining an identity of the object;
determining a potential change in capacitance of the touch screen based at least in part on the identity of the object;
determining a selection area on the touch screen;
determining first adjusted one or more parameters associated with the touch screen that are used to associate a second responsiveness parameter with a first touch sensor of the one or more touch sensors, the first touch sensor corresponding to the selection area and the second responsiveness parameter being different than the first responsiveness parameter;
determining an area that is different than the selection area;
determining second adjusted one or more parameters associated with the touch screen that are used to associate a third responsiveness parameter with a second touch sensor of the one or more touch sensors, the second touch sensor corresponding to the area and the third responsiveness parameter being different than the first responsiveness parameter and the second responsiveness parameter, at least one of the first adjusted one or more parameters or the second adjusted one or more parameters being based on the potential change in capacitance;
receiving an indication of a capacitive event on the touch screen, the capacitive event being associated with a contextual environment of the one or more contextual environments;
determining that the capacitive event is not associated with the selection area; and
disregarding the capacitive event.

2. The method as recited in claim 1, further comprising:
determining that the touch screen further comprises an electronic paper display; and
determining that the contextual environment corresponds to an update of the electronic paper display.

3. The method as recited in claim 1, further comprising determining that the contextual environment corresponds to a connection of an input/output attachment to the electronic device.

4. The method as recited in claim 1, further comprising receiving the indication of the capacitive event based at least in part on receiving an indication of a change in the capacitance of the touch screen.

5. The method as recited in claim 1, further comprising determining the first adjusted one or more parameters based at least in part on determining a modification to one or more filters to increase a sensitivity of the first touch sensor.

6. The method as recited in claim 1, further comprising determining the second adjusted one or more parameters based at least in part on determining a modification to one or more filters to decrease a sensitivity of the second touch sensor.

7. The method as recited in claim 1, further comprising:
receiving a second indication of a second capacitive event on the touch screen;
determining that the second capacitive event is associated with the selection area; and
recognizing the capacitive event as a touch on the touch screen.

8. A method comprising:
under control of one or more computing systems configured with executable instructions,
determining one or more contextual environments within which an electronic device operates based at least in part on information from one or more sensors associated with the electronic device, the electronic device including a touch screen comprising one or more touch sensors having a first responsiveness parameter;
determining, based at least in part on the information, that the electronic device is within a threshold distance from an object;
determining an identity of the object;
determining a potential change in capacitance of the touch screen based at least in part on the identity of the object;
determining a selection area on the touch screen;
determining, based at least in part on the potential change in capacitance, adjusted one or more parameters associated with the touch screen that are used to associate a second responsiveness parameter with a touch sensor of the one or more touch sensors, the touch sensor corresponding to the selection area and the second responsiveness parameter being different than the first responsiveness parameter;
receiving an indication of a capacitive occurrence associated with the touch screen;
determining that the capacitive occurrence corresponds to an area that is different than the selection area; and
disregarding the capacitive occurrence.

9. The method as recited in claim 8, further comprising receiving the indication of the capacitive occurrence based at least in part on receiving an indication of a change in capacitance on any surface of the electronic device.

10. The method as recited in claim 8, further comprising determining an occurrence of the contextual environment, wherein the determining comprises determining a connection of one or more input/output attachments to the electronic device.

11. The method as recited in claim 10, further comprising determining the connection of one or more input/output attachments based at least in part on employing a protocol of an input/output attachment of the one or more input/output attachments to identify one or more specific devices connected to the electronic device.

12. The method as recited in claim 8, further comprising determining the adjusted one or more parameters based at least in part on determining a modification to one or more filters to increase a sensitivity of the touch sensor.

13. An electronic device comprising:
one or more processors;
memory;
a capacitive touch screen coupled to the one or more processors and configured to detect one or more capacitive events on a capacitive touch screen of the electronic device; and one or more computer-executable instructions stored in or accessible by the memory and executable on the one or more processors to:
  determine an occurrence of one or more contextual environments of the electronic device based at least in part on information detected by one or more sensors associated with the electronic device;
  determining, based at least in part on the information, that the electronic device is within a threshold distance from an object;
  determining an identity of the object;
  determining a potential change in capacitance of the capacitive touch screen based at least in part on the identity of the object;
  assess the one or more capacitive events based at least in part on the occurrence of the one or more contextual environments of the electronic device; and
  determine an adjusted configuration of the capacitive touch screen by modifying a responsiveness parameter of one or more device components to account for the occurrence of the one or more contextual environments.

14. The electronic device as recited in claim 13, wherein the one or more sensors include a sensor for determining touch input expectation information that identifies the regions of the capacitive touch screen where the one or more capacitive events are expected to occur.

15. The electronic device as recited in claim 13, wherein the capacitive touch screen further comprises an electronic paper display to render content on the electronic device.

16. The electronic device as recited in claim 13, wherein:
  the electronic device further comprises one or more filters configured to alter implementation of the one or more capacitive events; and
  the one or more computer-executable instructions are further configured to modify the responsiveness parameter of the one or more device components by optimizing the one or more filters to account for the one or more capacitive events.

17. The electronic device as recited in claim 13, wherein:
  the electronic device further comprises one or more touch sensors associated with the capacitive touch screen to sense capacitive changes indicative of touch input on the capacitive touch screen; and
  the one or more computer-executable instructions are further configured to modify the responsiveness of the one or more device components based at least in part on:
    determining an occurrence of a contextual environment of the one or more contextual environments that identifies a selection area of the capacitive touch screen;
    in the selection area, associating a different responsiveness parameter with the one or more device components;
    determining an occurrence of a second contextual environment of the one or more contextual environments that identifies an area of the capacitive touch screen that is different than the selection area; and
    directing the one or more touch sensors to restrict reception of a capacitive event of the one or more capacitive events in the area.

18. The electronic device as recited in claim 13, wherein the one or more computer-executable instructions are further configured to:
  determine a modification to the responsiveness of the one or more device components based at least in part on an additional contextual environment of the one or more contextual environments that determines, based at least in part on the device connectivity information, a connection of one or more input/output attachments to the electronic device; and
  based at least in part on determining the connection of one or more input/output attachments to the electronic device, utilize at least one of an inter-integrated (i2C) bus, a serial peripheral interface bus, a peripheral component interconnect bus, a peripheral component interconnect express bus, or another messaging channel to determine the adjusted configuration of the capacitive touch screen.

19. The electronic device as recited in claim 13, wherein the one or more sensors include a sensor for determining device connectivity information indicating a connection of one or more input/output attachments to the electronic device.

20. The electronic device as recited in claim 13, wherein the one or more sensors include a sensor for determining proximity information indicating that the electronic device is operating within the threshold distance of other objects.

21. The electronic device as recited in claim 13, wherein:
  the electronic device further comprises one or more touch sensors associated with the capacitive touch screen to sense capacitive changes indicative of touch input on the capacitive touch screen; and
  the one or more computer-executable instructions are further configured to modify the responsiveness parameter of the one or more device components by directing the one or more touch sensors to determine a capacitive event of the one or more capacitive events in the selection area.

22. One or more non-transitory computer-readable media having computer-executable instructions that, when executed by one or more processors, cause one or more processors to perform operations comprising:
  determining one or more contextual environments that cause one or more capacitive events on an electronic device based at least in part on information detected by one or more sensors associated with the electronic device, the electronic device having a capacitive touch screen with a plurality of touch sensors associated with a first responsiveness parameter;
  determining, based at least in part on the information, that the electronic device is within a threshold distance from an object;
  determining an identity of the object;
  determining a potential change in capacitance of the capacitive touch screen based at least in part on the identity of the object;
  identifying a selection area on the capacitive touch screen;
  determining, based at least in part on the potential change in capacitance, adjusted one or more parameters associated with the capacitive touch screen that are used to associate a second responsiveness parameter with a touch sensor of the plurality of touch sensors, the touch sensor corresponding to the selection area and the second responsiveness parameter being greater than the first responsiveness parameter;
  receiving an indication of a capacitive occurrence on the capacitive touch screen;
  evaluating the indication of the capacitive occurrence based at least in part on the one or more contextual environments of the electronic device;
  determining that the capacitive occurrence is associated with at least one contextual environment of the one or more contextual environments and that the capacitive occurrence is not associated with the selection area; and disregarding the capacitive occurrence as a false capacitive occurrence or a missed capacitive occurrence.

23. One or more non-transitory computer-readable media as recited in claim 22, the operations further comprising monitoring the one or more contextual environments based at least in part on identifying that one or more input/output attachments have been connected to the electronic device.

24. One or more non-transitory computer-readable media as recited in claim 22, the operations further comprising receiving the indication of the capacitive occurrence based at least in part on receiving an indication of a change in an electrical charge of the capacitive touch screen of the electronic device.

25. One or more non-transitory computer-readable media as recited in claim 22, wherein the electronic device further comprises a bi-stable display.

26. One or more non-transitory computer-readable media as recited in claim 22, the operations further comprising determining the adjusted one or more parameters based at least in part on determining a modification to one or more filters to increase a sensitivity of the touch sensor.

27. One or more non-transitory computer-readable media as recited in claim 22, the operations further comprising:

identifying an area on the capacitive touch screen that is not associated with the selection area;

determining second adjusted one or more parameters associated with the capacitive touch screen that are used to associate a third responsiveness parameter with a second touch sensor of the plurality of touch sensors, the second touch sensor corresponding to the area and the second responsiveness being less than the first responsiveness parameter; and determining the second adjusted one or more parameters based at least in part on determining a modification to one or more filters to decrease a sensitivity of the second touch sensors.

* * * * *